United States Patent [19]

Parker

[11] Patent Number: 4,864,212

[45] Date of Patent: Sep. 5, 1989

[54] ENERGY ECONOMIZING AC POWER SYSTEM

[76] Inventor: Louis W. Parker, 2408 Sunrise Blvd., Fort Lauderdale, Fla. 33304

[21] Appl. No.: 305,679

[22] Filed: Feb. 3, 1989

[51] Int. Cl.$^4$ .............................................. H02P 7/36
[52] U.S. Cl. ..................................... 318/798; 718/812
[58] Field of Search ................ 318/729, 779, 798–799, 318/805–809, 812

[56] References Cited

U.S. PATENT DOCUMENTS

| | | | |
|---|---|---|---|
| 3,441,823 | 4/1969 | Schlabach | 318/809 |
| 4,369,403 | 1/1983 | Lee | 318/812 |
| 4,482,852 | 11/1984 | Muskovac | 318/812 |

OTHER PUBLICATIONS

Marcus, J., *Sourcebook of Electronic Circuits*, McGraw Hill, 1968, p. 812.
*Electronic Circuit Design Handbook*, Tab Books, 1970 p. 726.

*Primary Examiner*—William M. Shoop, Jr.
*Assistant Examiner*—David Martin
*Attorney, Agent, or Firm*—Pollock, Vande Sande & Priddy

[57] ABSTRACT

An energy economizing AC power control system for energizing an induction motor comprises a sine wave power source which is connected via a triac to the motor, and a control circuit which controls the conduction of the triac as a function of the load on the motor to provide the motor with short bursts of energy. The control circuit includes a field effect transistor having a gate electrode which is energized by a train of sawtooth shaped control signals having a repetition rate which is twice the frequency of the power source, and DC bias potential is also applied to the gate electrode with the magnitude of the DC bias potential being varied with variations in the current flowing through the motor stator winding. The field effect transistor is rendered conductive during the sawtooth excursion of each of the control signals, at a time subsequent to the commencement of each sawtooth signal, which is jointly dependent on the instantaneous magnitude of the rising excursion of each sawtooth signal and the magnitude of the DC bias potential. The field effect transistor generates a pulse during each sawtooth excursion, at a time following commencement of the sawtooth excursion which is accordingly dependent on the load on the motor, and each such pulse is used to determine the time at which the triac commences conduction during each half wave of energy from the sine wave power source.

19 Claims, 1 Drawing Sheet

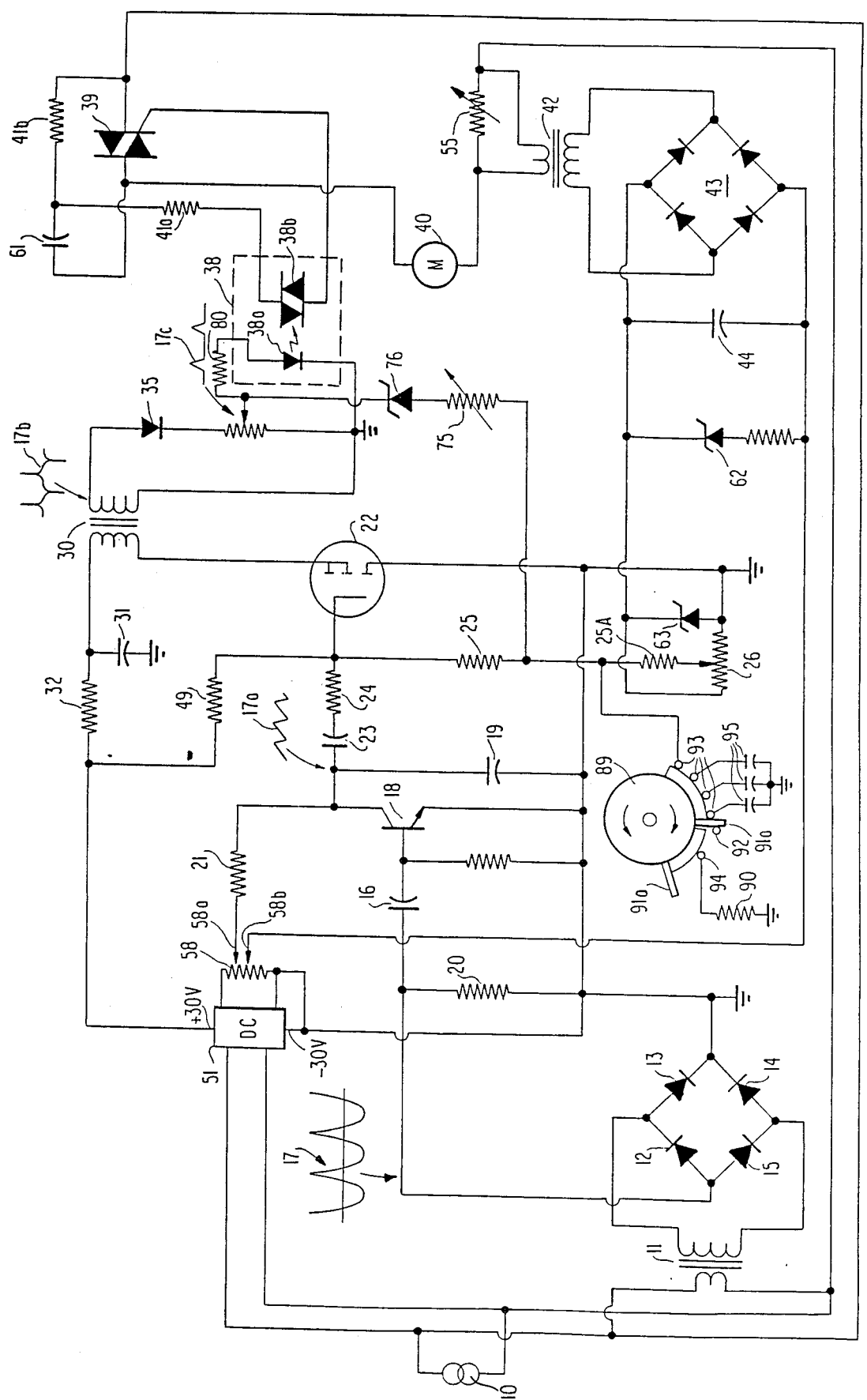

ENERGY ECONOMIZING AC POWER SYSTEM

BACKGROUND OF THE INVENTION

The present invention constitutes an improvement in the system disclosed in my prior U.S. Pat. No. 4,176,307 issued Nov. 27, 1979, for "Energy Economizing AC Power Control System" and, more particularly, relates to a system which produces results similar to those achieved in my prior patented system but does so by means of a circuit which is far simpler.

The disclosure of my said prior U.S. Pat. No. 4,176,307 is incorporated herein by reference. It teaches an arrangement which is capable of reducing the iron and copper losses in an induction motor when the motor is operating at less than full rated load. This prior system incorporates a wave modifier which is operative to apply full sine waves of voltage from an AC power source to the stator winding of an induction motor during rotational start-up and speed build-up of the motor and, as the motor approaches full speed, the said prior system then operates to vary the electrical angle of each cycle of the power source which is actually coupled to the stator winding to provide varying fractions of each sine wave of voltage from the power source to the stator winding in accordance with the energy requirements imposed on the motor by the rotor load at any given moment. The system thus functions to substantially reduce the iron and copper losses of the induction motor by causing the average current supplied from the power source to the stator winding to be supplied primarily as a function of the load on the motor as said load varies.

SUMMARY OF THE INVENTION

The primary purpose of the present invention is to provide a simpler circuit which also saves electric power, and which does so by momentarily disconnecting an AC power line from an induction motor for a part of the AC cycle. This can be done when the motor is not fully loaded since the motor is able to run at nearly normal speed on the momentum generated in the motor when it receives short bursts of energy from the power line. The duration of the short bursts is automatically regulated by the amount of the average current drawn from the power line. The current is passed through a triac that normally conducts current in either direction after it receives a short pulse of low voltage, said pulse being applied to the triac after the start of each half wave of the control element of the input voltage. The sooner the triac receives such a pulse after the start of the half wave, the longer will be the duration of current flow from the triac through the stator winding of the motor until the said half wave of energization next passes through zero voltage. This momentary zero voltage shuts off the triac. The longer the duration of current flow, the more will be the energy received by the motor, resulting in greater torque.

Consequently the main function of the invention is to generate control pulses of a few milliseconds duration, and to apply such control pulses to the triac at definite times during each AC cycle. The time of occurrence of these control pulses must, in addition, automatically vary within the time duration of each half cycle from the AC power source in order to regulate the energy applied to the motor.

The foregoing results are achieved in the present invention by providing a sine wave power source which is connected via solid state power switching means, preferably a triac, to an induction motor. Circuitry connected to the sine wave power source is also used to generate a train of sawtooth shaped signals at a repetition rate which is twice the frequency of the power source. The gate electrode of a substantially nonconductive field effect transistor is energized by the said train of sawtooth shaped signals, and a DC bias potential is also applied to the said gate electrode so that the field effect transistor is rendered conductive during the sawtooth excursion of each signal applied to its gate electrode, at a time subsequent to the commencement of the rising excursion of each said sawtooth signal, which time is jointly dependent on the instantaneous potential of the rising excursion and the magnitude of a DC bias potential.

The DC biasing means includes means responsive to changes in the magnitude of current flowing through the motor stator winding resulting from changes in the load on the motor to vary the magnitude of the DC bias potential, whereby the point during each sawtooth wave when the field effect transistor is rendered conductive is a function of the load on the motor. Provision is also made for a softstart operation, when desired, to reduce high current surges when the motor is started.

The field effect transistor includes a drain electrode which is connected to a capacitor through the primary winding of a transformer. A DC power supply is coupled to the capacitor for charging the capacitor through a resistor, and the capacitor is thereafter discharged through the field effect transistor via the transformer primary winding each time the field effect transistor is rendered conductive. Each discharge of the capacitor is operative to generate a pulse in a secondary winding of the transformer, and that pulse is used to control the conduction of an optocoupler the output of which in turn controls the conduction of the triac to energize the motor.

BRIEF DESCRIPTION OF THE DRAWINGS

The foregoing objects, advantages, construction and operation of the present invention will become more readily apparent from the following description taken together with the accompanying drawing which constitutes a schematic diagram of an energy economizing AC power system constructed in accordance with the present invention.

DESCRIPTION OF THE PREFERRED EMBODIMENTS

Referring to the drawing, alternating current from a sine wave power source 10 is coupled to a DC power supply 51 which generates a DC voltage that is used for various purposes to be described hereinafter, and is also coupled to the primary winding of a transformer 11. The secondary winding of transformer 11 is connected across a rectifier bridge comprising diodes 12, 13, 14 and 15. The load across the rectifier bridge takes the form of a resistor 20, and operation of the rectifiers produces a pulsating DC output across load 20 which goes through zero twice during each cycle of sine wave source 10 as illustrated by wave form 17.

The pulsating wave 17 is fed via capacitor 16 to the base of a transistor 18, and each sharp peak of the pulsating wave 17 acts as a pulse which renders transistor 18 conductive. When this pulse ceases, the current through transistor 18 also ceases. A capacitor 19 connected across transistor 18 is charged from the DC output of power supply 51 via-a resistor 21 when the transistor 18 is nonconductive, and is rapidly discharged through transistor 18 each time the transistor 18 is rendered conductive. This is repeated 120 times per second for a 60 cycle power line frequency supplied by source 10. The charging and discharging of capacitor 19 generates a train of sawtooth shaped signals 17a at the junction of capacitor 19 and the collector of transistor 18, and this train of sawtooth waves is fed via capacitor 23 and resistor 24 to the gate electrode of a field effect transistor 22. The amplitude of the sawtooth wave is controlled by variation of contact 58a on resistor 58.

The resistor 58, which is connected across or comprises a portion of DC power supply 51, has a further variable connector 58b which supplies current via a rectifier bridge 43 to a potentiometer 26 to generate a DC bias voltage which is coupled via resistors 25 and 25a to the gate electrode of field effect transistor 22. Resistors 24 and 25, 25a are of approximately equal value. A field effect transistor requires about three volts positive bias on its gate electrode to cause current to pass from the source to the drain of the transistor. The bias voltage which is supplied to field effect transistor 22 via resistors 25 and 25a is insufficient to cause conduction of field effect transistor 22, and when the equipment is first energized capacitor 19 also has no potential across it. However as the potential across capacitor 19 increases, the rising excursion of each sawtooth wave in wave form 17a will eventually reach a potential which, in combination with the bias potential provided by resistors 25, 25a will cause field effect transistor 22 to commence conduction. The actual point in time at which such conduction commences, relative to the start of the rising excursion of a sawtooth wave, is accordingly determined by the magnitude of the DC bias potential that is supplied to the gate electrode of field effect transistor 22 via resistors 25, 25a, and will vary with variations in that DC bias potential.

Field effect transistor 22 draws its drain current from a capacitor 31 which is charged via a resistor 32 connected to DC power supply 51. The drain current of the transistor 22 passes through the primary winding of a transformer 30. Capacitor 31 is only partially charged through resistor 32 before its discharge through transistor 22 begins and, as a result, after about two milliseconds (assuming about an 8.3 millisecond operating cycle) the voltage across capacitor 31 drops to a point where transistor 22 nearly ceases to operate. As a result, normal current is drawn through the primary of transformer 30 for only about two milliseconds, which produces a negative voltage pulse in the primary winding of transformer 30 and a positive pulse in the secondary of said transformer as indicated by waveform 17b. A diode 35 is connected in series with the output of transformer 30 to produce a train of unipolar pulses as illustrated by waveform 17c.

The voltage across capacitor 19 increases as it is charged from the DC power supply 51, but renders the field effect transistor 22 conductive only when the combined effect of the rising potential across capacitor 19 and the DC bias supplied by potentiometer 26 and resistors 25, 25a increase to a value above the turn-on voltage of three volts at the gate of transistor 22. The timing of this voltage turn-on point, and therefore the timing of the pulses 17c, can be adjusted by adjusting the bias voltage that is supplied via resistors 25, 25a to the gate electrode of field effect transistor 22. If the bias voltage is comparatively low, it takes a longer time after the start of a half wave of the input voltage for the voltage across capacitor 19 to increase to a value which exceeds the turn-on potential of the field effect transistor 22, while a higher positive bias adds to the instantaneous output potential of capacitor 19 so that a shorter time after the start of a half wave of the input voltage occurs before the transistor 22 is turned on. The DC bias potential applied to transistor 22 is varied as a function of the load on induction motor 40 in the manner described hereinafter, so that each pulse 17c occurs at the proper point in time during the AC wave from sine wave power source 10 to supply only that portion of the AC wave which is needed to keep the motor rotating near normal speed.

Each pulse 17c is applied to a photodiode 38a in a conventional optocoupler 38 to turn on a low power triac 38b in said optocoupler, and triac 38b is in turn connected via resistors 41a and 41b to the control electrode of a higher powered triac 39 which is connected to AC source 10 and supplies power from said AC source to motor 40. The optocoupler 38 requires very little power to operate, and completely eliminates any electrical coupling between the motor 40 and the energy-saving motor controller. In order to assure good contact for the current to drive the motor, an additional signal may be sent to the optocoupler 38 through a resistor 80. This voltage is obtained from the arm of potentiometer 26 through variable resistor 75 and Zener diode 76. When the voltage between this arm and ground is near maximum, i.e., when the complete sine wave is required, Zener diode 76 connects this high voltage (8–10 volts) to the optocoupler 38 to keep the coupler reliably connected even if a small voltage variation occurs.

In normal operation, the controlling bias voltage applied to field effect transistor 22 is obtained, as described previously, from potentiometer 58 and the stator current of motor 40. This stator current varies with variations in the load on the induction motor 40, and passes through the primary of transformer 42 the secondary of which feeds rectifier bridge 43. The DC output of rectifier bridge 43 is filtered by a capacitor 44 and fed to potentiometer 26 which develops the bias voltage. The bias voltage applied to transistor 22 is accordingly proportional to the load on motor 40.

When power is first applied to the control system of the present invention the gate electrode of transistor 22 must be biased to a point where at least a minimum drain-source current flows, in order to initialize operation; and this is accomplished by a high value resistor 49 which is connected between power supply 51 and the gate electrode of field effect transistor 22 to bias the said gate electrode to a point where at least a minimum drain-source current flows through transistor 22. At the time of motor start, maximum current flows through the stator winding of motor 40 and through the primary winding of transformer 42, and the correspondingly large current supplied by rectifier bridge 43 through potentiometer 26 generates the highest bias voltage. The voltage which is applied via resistors 25, 25a raises the potential of the gate electrode of field effect transistor 22 at the time of motor start to a value above +3V, and this bias voltage is itself sufficient to cause the pulses 17c to occur at the beginning of each half cycle of energization from sine wave source 10, independent of the sawtooth potential provided by circuit 18, 19, 21, whereby triac 39 applies full power generation to the motor. Subsequent to motor start, the motor stator current decreases in magnitude, reducing the bias potential that is applied to the gate of transistor 22 via resistors 25, 25a to a lesser value, e.g., +1.5V, and the sawtooth wave generator 18, 19, 21 and bias source then cooperate with one another in the manner described previously to supply energization to the motor during a portion only of each half wave from source 10 sufficient to keep the motor running. Zener diodes 62 and 63 eliminate the current surge which might otherwise occur when motor 40 starts its rotation.

As the load on the motor 40 increases, the current in its stator coil increases as well and the bias voltage supplied to the transistor 22 via the secondary winding of transformer 42, rectifier bridge 43, potentiometer 26, and resistors 25, 25a, accordingly also increases. The system thus comprises, in effect, a closed feedback loop which automatically supplies only that amount of energizing current to motor 40 which is required to drive the then existing motor load and to compensate for motor losses, with the result that induction motor 40 always operates at its most efficient power setting thereby to save the energy which would otherwise normally be wasted whenever an induction motor operates at less than its full rated load.

A variable resistor 55 is connected across the primary winding of transformer 42 to vary the bias on transistor 22 by adjusting the current flow through said primary winding to a value which will assure that the circuit operates properly for small motors. Larger motors operate equally well if the variable resistor 55 is adjusted to a lower resistance value to present the same bias voltage to the field effect transistor as is used for such smaller motors. The only change required in the equipment, when using larger motors, is the use of a triac 39 having a higher current rating.

It is desirable in some cases to include provision for a soft-start operation to reduce high current surges when the motor is started, and also for mechanical reasons. Such soft start may be obtained by connecting a large capacitance across potentiometer 26, i.e., between resistor 25a and the grounded chassis of the equipment. More particularly, in order to regulate the starting delay of the motor, one or more capacitors 95 are connected to resistor 25a and potentiometer 26 through a tap switch that comprises a rotor 89 having two metal segments A and B riding on brushes 93 and 94. The rotor 89 can be rotated about 80 degrees. When rotated clockwise, it connects capacitors 95 to potentiometer 26 as shown on the drawing. When rotated counter-clockwise, the rotor connects the capacitors to ground through resistor 90 to discharge them. There is one stop 92 against which bars 91a will bump. If no soft start is desired, the switch may remain in the capacitor shorting position. Several capacitors 95 are provided so that the time delay can be regulated if desired.

While I have thus described a preferred embodiment of the present invention, many variations will be apparent to those skilled in the art. It must therefore be understood that the foregoing description is intended to be illustrative only, and not limitative of the present invention, and all such variations and modifications as are in accord with the principles described are meant to fall within the scope of the appended claims.

Having thus described my invention I claim:

1. An energy economizing AC power control system for energizing an induction motor, comprising an AC induction motor having a stator winding, a sine wave power source, solid state power switching means disposed between said power source and said motor for energizing said motor, means coupled to said sine wave power source for generating a train of sawtooth shaped signals at a repetition rate which is twice the frequency of said power source, a substantially nonconductive field effect transistor having a gate electrode, means coupling said train of sawtooth shaped signals to said gate electrode, biasing means for applying a DC bias potential to said gate electrode, said field effect transistor being rendered conductive during the rising excursion of each of said sawtooth signals at a time subsequent to the commencement of each said rising excursion which is jointly dependent on the instantaneous potential of said rising excursion and the magnitude of said DC bias potential, said biasing means including means responsive to changes in the magnitude of current flowing through said motor stator winding resulting from changes in the load on said motor for varying the magnitude of said DC bias potential, and means responsive to the conduction of said field effect transistor for rendering said solid state power switching means conductive to energize said motor for a time interval during the occurrence of each of said sawtooth shaped signals which is a function of the load on said motor, said field effect transistor including a drain electrode which is connected to a capacitor through the primary winding of a transformer, a DC power supply coupled to said capacitor, said capacitor being charged from said DC power supply when said field effect transistor is nonconductive and being discharged through said field effect transistor via said transformer primary winding each time said field effect transistor is rendered conductive, each discharge of said capacitor being operative to generate a pulse in a secondary winding of said transformer, and control means responsive to occurrence of each said pulse in said transformer secondary winding for rendering said solid state power switching means conductive to energize said motor.

2. The power control system of claim 1 wherein said biasing means includes resistor means connected between said DC power supply and said gate electrode of said field effect transistor for biasing said gate electrode to a value which establishes the minimum drain-source current of said field effect transistor.

3. The power control system of claim 1 wherein said solid state power switching means comprises a triac connected between said sine wave power source and said motor, said control means comprising an optocoupler having a photodiode which is energized in response to the occurrence of each pulse in said transformer secondary winding and a light responsive element which is adjacent to said photodiode and connected to a control element of said triac.

4. The power control system of claim 3 wherein said means for generating said train of sawtooth shaped signals comprises rectifier means coupled via transformer means to said sine wave power source and operative to produce a pulsating voltage wave, having a rate of pulsation which is twice the frequency of said power source, a normally nonconductive transistor, means coupling said pulsating voltage wave to said transistor to render said transistor periodically conductive at a repetition rate which corresponds to the rate of the pulsations in said voltage wave, a further capacitor connected to said DC power supply, and means connecting said further capacitor across said transistor, whereby said further capacitor is charged from said DC power supply when said transistor is nonconductive and is rapidly discharged through said transistor each time said transistor is rendered conductive thereby to generate said train of sawtooth shaped signals.

5. The power control system of claim 1 wherein said biasing means includes a DC power supply, resistor means connected to said DC power supply for supplying a DC potential, transformer means having a primary winding and a secondary winding, said primary winding being connected to the stator winding of said motor, rectifier means connected to said secondary winding of said transformer means, and means for connecting the output of said rectifier means to said resistor means to vary said DC potential.

6. The power control system of claim 5 wherein said resistor means includes at least one adjustable resistor for controlling the magnitude of the DC potential which is applied as a bias potential to the gate electrode of said field effect transistor.

7. The power control system of claim 6 wherein said adjustable resistor is connected to said primary winding of said transformer means.

8. The power control system of claim 6 wherein said adjustable resistor is connected to the output of said rectifier means.

9. The power control system of claim 6 wherein said adjustable resistor comprises a portion of said DC power supply.

10. The power control system of claim 5 including means for selectively connecting capacitor means to said resistor means to vary the starting characteristics of said motor.

11. The power control system of claim 6 including switch means for selectively connecting capacitor means to said adjustable resistor to control the starting characteristics of said motor.

12. The power control system of claim 11 wherein said capacitor means comprises a plurality of capacitors, said switch means being operative to connect selected ones of said plurality of capacitors to said adjustable resistor.

13. The power control system of claim 11 wherein said switch means also includes means for discharging those capacitors which are not connected to said adjustable resistor.

14. The power control system of claim 1 wherein said biasing means includes transformer means having a primary winding and a secondary winding, said primary winding being connected to the stator winding of said motor, rectifier means connected to said secondary winding of said transformer means, and means responsive to the output of said rectifier means for marrying the bias potential.

15. The power control system of claim 14 wherein said biasing means includes an adjustable resistor for controlling the magnitude of said bias potential.

16. The power control system claim including switch means for selectively connecting capacitor means to said adjustable resistor to control the starting characteristics of said motor.

17. The power control system of claim 16 wherein said capacitor means comprises a plurality of capacitors, said switch means being operative to connect selected ones of said plurality of capacitors to said adjustable resistor.

18. The power control system of claim 16 wherein said switch means also includes means for discharging those capacitors which are not connected to said adjustable resistor.

19. The power control system of claim 1 wherein said biasing means includes an adjustable resistor for selectively varying the magnitude of said DC bias potential which is applied to said gate electrode of said field effect transistor.

* * * * *